United States Patent [19]
Rubin

[11] 3,921,373
[45] Nov. 25, 1975

[54] POWER RAKE

[75] Inventor: Robert M. Rubin, Lincoln, Nebr.

[73] Assignee: Outboard Marine Corporation, Waukegan, Ill.

[22] Filed: Sept. 13, 1974

[21] Appl. No.: 505,559

[52] U.S. Cl. ............... 56/16.6; 15/83; 56/16.7; 56/202; 56/364; 172/42; 172/112
[51] Int. Cl.² .......................................... A01D 51/00
[58] Field of Search ......... 56/16.6, 16.7, 17.4, 202, 56/364, 12.7; 15/83–86, 79; 172/42 X, 112 X

[56] References Cited
UNITED STATES PATENTS

| | | | |
|---|---|---|---|
| 2,194,297 | 3/1940 | Drumm | 172/42 |
| 2,505,576 | 4/1950 | Reitan | 56/16.6 X |
| 2,520,488 | 8/1950 | Batchelder | 56/16.7 |
| 2,525,090 | 10/1950 | Bott | 56/16.6 |
| 2,755,092 | 7/1956 | Donahoe | 15/83 X |
| 3,564,823 | 3/1971 | Rhoads | 56/16.7 |

Primary Examiner—J. N. Eskovitz
Attorney, Agent, or Firm—Michael, Best & Friedrich

[57] ABSTRACT

Disclosed herein is a power rake comprising a housing supported by front and rear wheels for travel over the ground and including a top wall and spaced side walls, a handle extending from the housing and including a portion adapted to be gripped by an operator to propel and guide the rake over the ground, a thatching reel including a plurality of thatching blades and supported in the housing for rotation of the blades in respective vertical paths, a drive for rotating the reel so that, adjacent to the ground, the blades travel in the direction opposite to the intended direction of travel, and a baffle extending downwardly and forwardly between the side walls from behind the reel and terminating adjacent to the periphery of the path of the blades.

10 Claims, 8 Drawing Figures

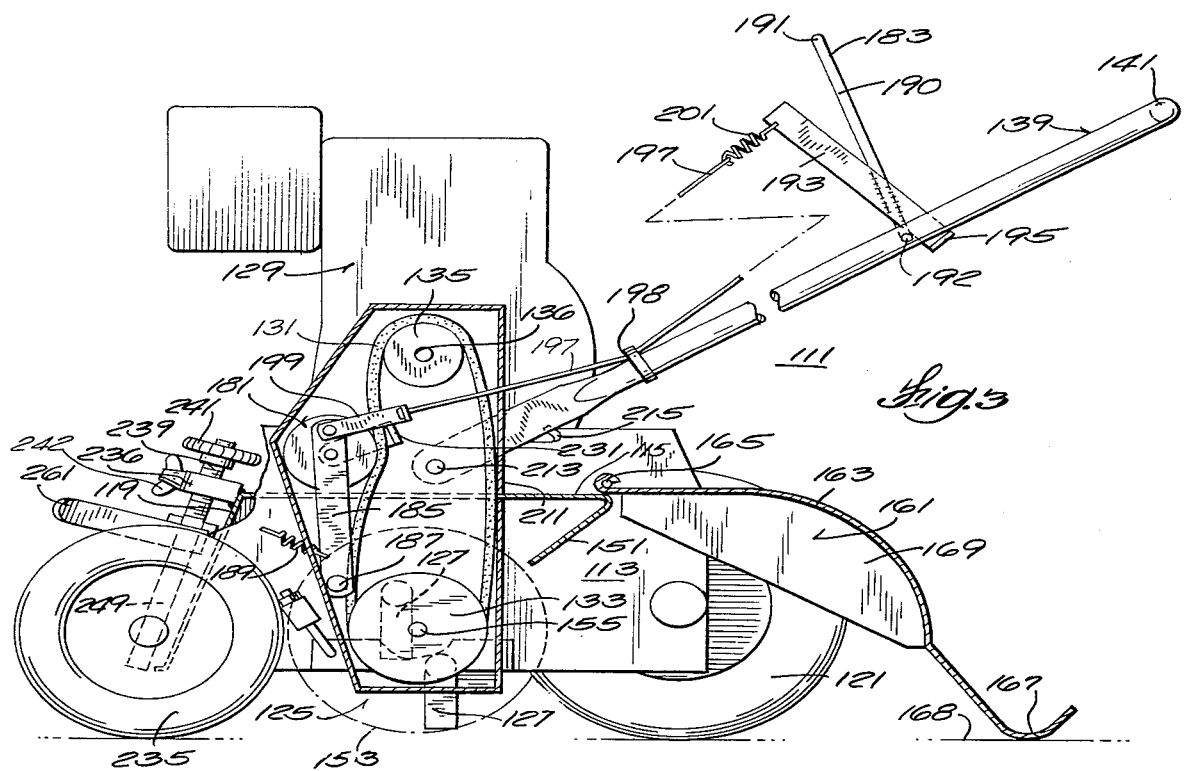
Fig. 3
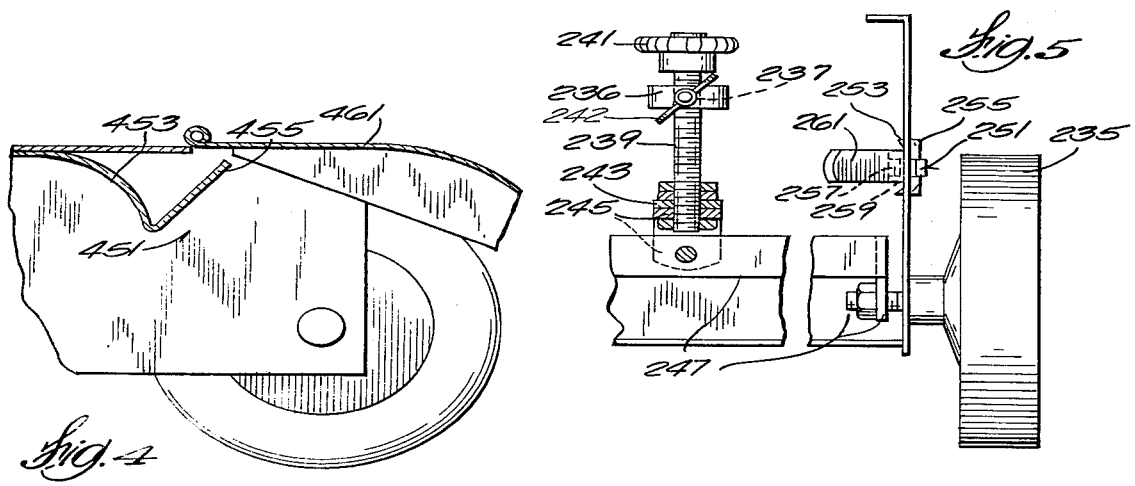
Fig. 4
Fig. 5

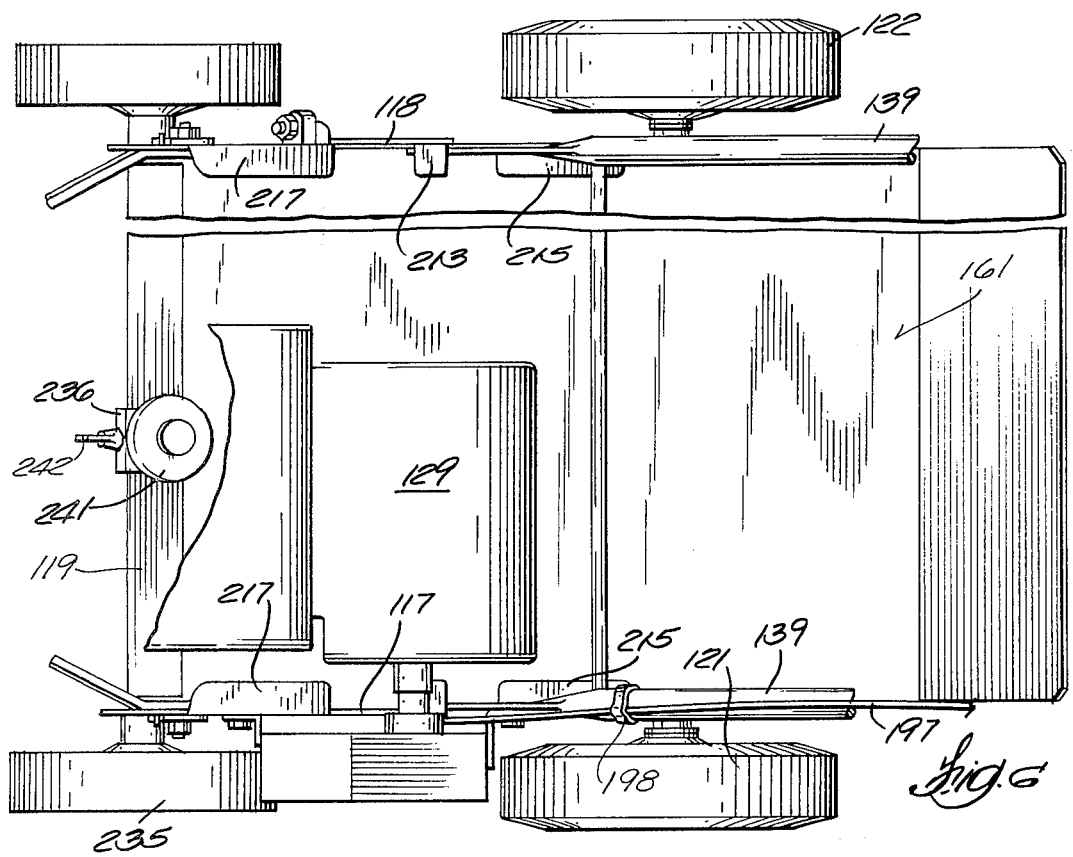
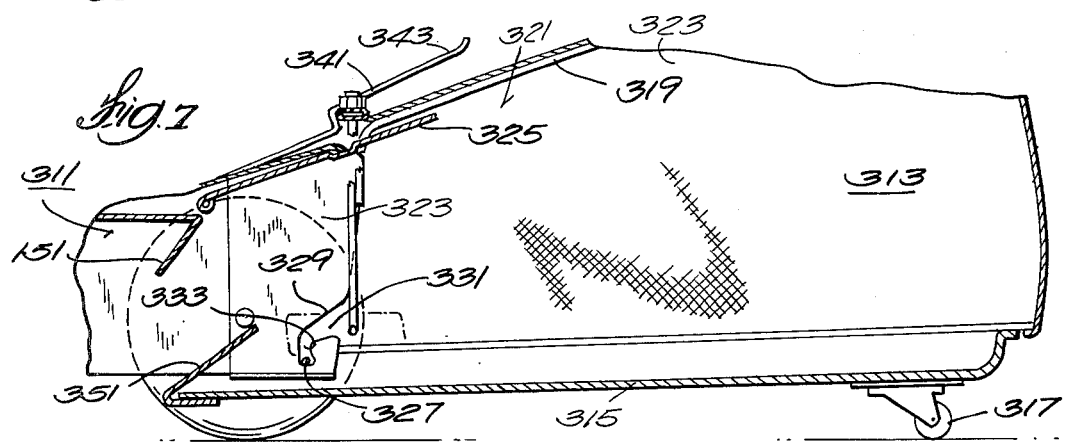
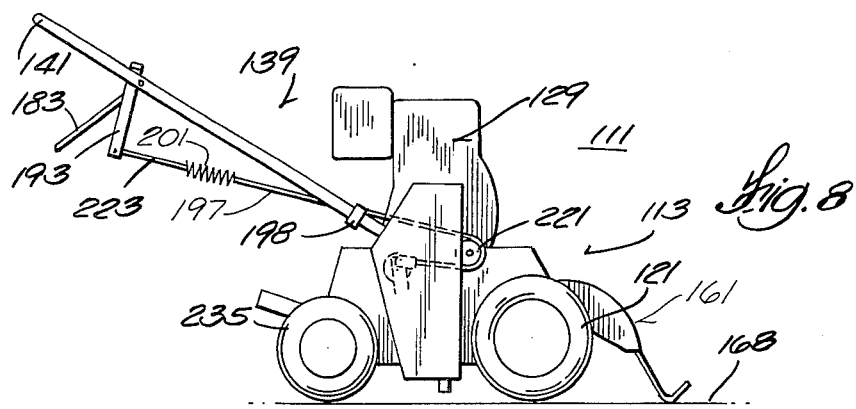

POWER RAKE

BACKGROUND OF THE INVENTION

The invention relates generally to power rakes which are particularly adapted for thatching lawns. A prior power rake 11 is shown in FIGS. 1 and 2 of the drawings and includes a housing 13 comprising a top deck or wall 15 which is welded or otherwise fixed to a pair of laterally spaced side walls 17 (only one shown in FIG. 2). Extending downwardly from the front edge of the top wall 15 and between the side walls 17 is a front wall 19.

The housing 13 is supported for travel over the ground by a pair of rear wheels 21 (only one shown in FIGS. 1 and 2) respectively supported by the side walls 17 and by a single front wheel 23 which is mounted centrally between the side walls 17 and can be selectively vertically positioned.

Included in the power rake 11 is a schematically illustrated reel 25 together with means mounting the reel 25 from the housing side walls 17 for rotation about a horizontal axis transverse to the direction of intended power rake movement.

The reel 25 includes a plurality of blades 27 which extend radially of the axis of reel rotation and which are rotatable in respective vertical planes in common with the reel 25 and whichh are swingable relative to the reel about horizontal axes spaced from the reel axis.

Also included in the prior power rake 11 is a power source 29 comprising an internal combustion engine mounted on the top wall 15 adjacent to one of the side walls 17.

Extending between the power source 29 and the reel 25 in an endless belt 31 which is reeved around a pulley 33 constituting a part of the reel 25 and around a pulley 35 on the output shaft of the engine or power source 29. Suitable means such as an adjustably located idler wheel 37 are provided for removing slack from the belt 31 to insure power transmission.

Connected to and extending rearwardly from housing 13 is a generally U-shaped handle 39.

Also included in the power reel 11 is a baffle 41 which extends downwardly and rearwardly from the rearward edge of the top wall 15.

SUMMARY OF THE INVENTION

The invention provides a power rake comprising a housing including a top wall, spaced side walls, and means supporting the housing for travel over the ground, a thatching reel including a plurality of thatching blades, means supporting the thatching reel in the housing for rotation of the blades in respective vertical paths, means for rotating the reel so that, adjacent to the ground, the blades travel in the direction opposite to the intended direction of travel, and baffle means extending downwardly and forwardly between the side walls from behind the reel and terminating adjacent to the periphery of the path of the blades.

In further accordance with one embodiment of the invention, the baffle terminates in the area between about 1 o'clock and 3 o'clock relative to the axis of reel rotation when seen from the side.

In accordance with another embodiment of the invention, the power rake also includes a guard having a width substantially equal to the distance between the side walls and having a forward portion and a rearward portion, together with means pivotally mounting the forward guard portion to the housing with the forward guard portion extending to adjacent the baffle and with the rearward guard portion extending to adjacent the ground. In a preferred embodiment, the forward guard portion extends approximately tangentially to the baffle, and in fore and aft section, is downwardly concave, and the rearward guard portion, in fore and aft section, is upwardly concave.

In accordance with another embodiment of the invention, the power rake includes a thatch catcher detachably connected to the housing and extending rearwardly therefrom, and a member mounted on the housing and extending between the side walls and rearwardly from the baffle for pivotal movement between a first position located in adjacent relation to the ground when the catcher is detached from the housing and a second position located, when the catcher is connected to the housing, in bridging relation between the housing and the catcher. In a preferred embodiment, the housing side walls extend rearwardly beyond the top wall and the catcher is releasably connected to the side walls and includes a bottom wall having a forwardly extending portion located between the side walls, and the catcher further includes, adjacent to the bottom of the part adjacent to the housing, a deflector extending upwardly and rearwardly between the side walls and in downwardly spaced, generally parallel relation to the baffle so as to define, together with the side walls, the baffle, and the member, a thatch discharge passageway between said housing and said catcher.

The invention also provides a power rake comprising a housing having a top wall and side walls depending from the top wall, front wheel support and guide means comprising means on the housing defining a threaded, vertically extending aperture located closer to one of the side walls than to the other of the side walls, a shaft threaded through the aperture and including, at the upper end thereof, a manually gripable head, a hanger connected to the lower end of the shaft for relative rotary movement therebetween about the axis of the shaft and for common vertical movement with the shaft in response to shaft rotation, means for releasably preventing rotation of the shaft, axle means connected to the hanger for swinging movement in a vertical plane about a fore and aft axis and extending to the side walls, means on the side walls and on the axle means for guiding vertical movement of the axle means, and spaced wheels mounted on the axle means on each side of the hanger.

In further accordance with one embodiment of the invention, the guide means extends vertically and there is further included releasable means associated with the guide means for adjustably regulating the permissible length of vertical movement of the axle means. In a preferred embodiment, the guide means comprises a vertically extending slot through which the axle means extends and a clamp block is movable along the slot and includes lever means for releasably clamping the block in adjusted position relative to the slot.

The invention also provides a power rake comprising a housing supported by wheel means for travel over the ground, a handle extending from the housing and including a portion adapted to be gripped by an operator to propel and guide the rake over the ground, a reel including a plurality of cutting blades, means on the housing mounting the reel for rotation of the cutting blades in respective vertical paths, a power source, clutch means for selectively transmitting power from the power source to the reel for rotation thereof, and including a member movable relative to a position providing power transmission between the power source and the reel, means biasing the member away from the power transmitting position, a control mounted on the handle for movement relative to a position adjacent to the handle portion, and a linkage connected to the control and to the member so as to retain the member in the power transmitting position against the action of the biasing means when the control is retained in the position adjacent to the handle portion and to permit movement of the member away from the power transmitting position and movement of the control away from the handle portion in response to action of the biasing means when the control is not held in adjacent relation to the handle portion.

In further accordance with one embodiment of the invention, the clutch means includes an endless element operatively connected to the power source and to the reel and the member comprises a rotatable idler operative, when in the power transmitting position, to remove slack from the endless element so as to cause power transmission thereby. In a preferred embodiment of the invention, the idler engages the outside surface of the endless element and the member has fixedly associated therewith a brake which is movable with the idler and which is movable to braking engagement with the inside surface of the endless element when the member is moved from the power transmitting position.

One of the principal features of the invention is the provision of a power rake or thatcher including a baffle preventing or reducing thatch recirculation within the housing and thereby to substantially reduce thatch accumulation in the housing.

Another of the principal features of the invention is the provision of a power rake including a guide which serves to deposit thatch on the ground and to prevent discharge of solid objects toward the operator.

Another of the principal features of the invention is the provision of a power rake including a rearwardly extending and detachably connected thatch catcher, together with a member which is pivotally carried by the housing and which, when the catcher is disconnected, extends between the side walls to adjacent to the ground and serves as a guard and which, when the catcher is connected to the housing, extends between the housing and catcher and serves as the upper wall of a thatch discharge passageway.

Another of the principal features of the invention is the provision of a power rake including a power transmitting drive and controlling linkage operable to maintain power transmission to the reel only when the control is manually retained by the operator in selected position.

Other features and advantages of the invention will become known by reference to the following drawings, general description, and claims.

DRAWINGS

FIG. 3 is a side elevational view, partially broken away, of a power rake embodying various of the features of the invention.

FIG. 4 is a fragmentary view showing a modified form of baffle and guard construction.

FIG. 5 is a partially broken away and enlarged fragmentary view of the front wheel mounting arrangement incorporated in the power rake shown in FIG. 3.

FIG. 6 is a top view of the power rake shown in FIG. 3.

FIG. 7 is a fragmentary side elevational view of a power rake which includes a catcher and which embodies various of the features of the invention.

FIG. 8 is a side view of the power rake shown in FIG. 3 when arranged for up-milling operation.

Figure 1:
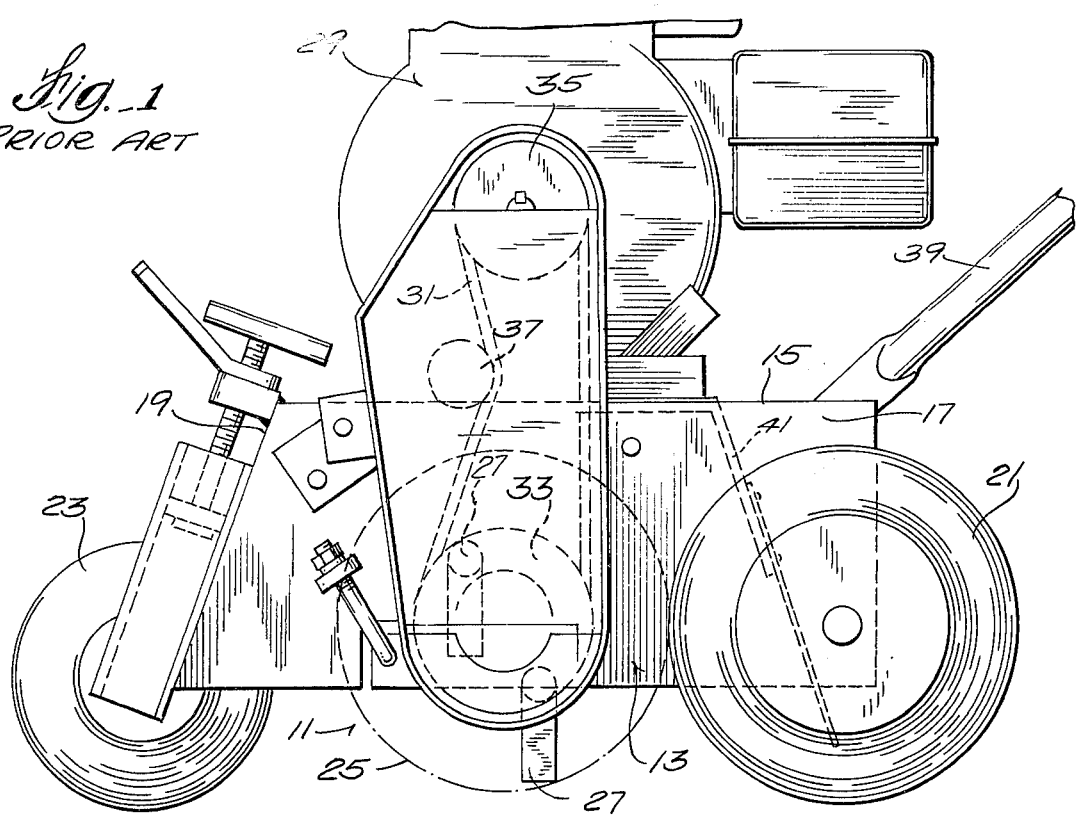
FIG. 1 is a side elevational view of a prior power rake.
Figure 2:
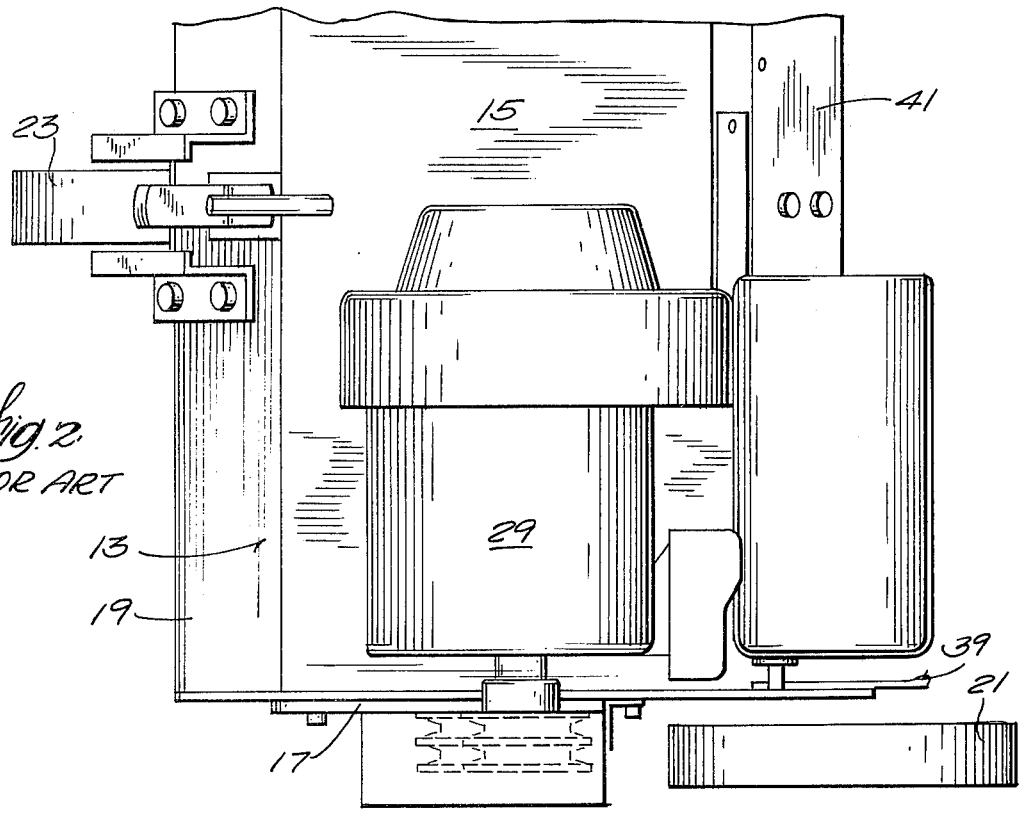
FIG. 2 is a top view of the prior power rake shown in FIG. 1.

Before explaining the invention is detail, it is to be understood that the invention is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for purpose of description and should not be regarded as limiting.

GENERAL DESCRIPTION

Shown in FIGS. 3, 5 and 6 is a power rake 111 which embodies various of the features of the invention. As in the prior power rake 11, the power rake 111 includes a housing 113 including a top deck or wall 115, a pair of side walls 117 and 118 extending vertically from the side edges of the top wall 115, and a front wall 119 extending downwardly and forwardly from the forward edge of the top deck or wall 115 between the side walls 117 and 118.

The housings 111 is supported for travel over the ground by wheel means including a pair of transversely spaced, rearwardly located wheels 121 and 122 respectively rotatably supported by a rearward part of the side walls 117 and 118. If desired, means can be provided for adjustably vertically supporting the rear wheels 121 and 122 relative to the housing 113.

Rotatably supported by the side walls 117 and 118 is a thatching reel 125 constructed substantially identically to the reel 25 included in the prior power rake 11 and including a plurality of blades 127 rotatable in vertical paths.

Mounted on the top wall 115 adjacent to the side wall is a power source 129 which can be in the form of an internal combustion engine in off-set relation to the fore and aft center line of the rake 111.

Means are also included for transferring power from the power source 129 to the reel 125 and including an endless belt 131 trained around a pulley 133 on the reel 125 and around a pulley 135 on an output shaft 136 extending from the power source 129.

Connected to and extending from the housing 113 is an inverted "U" shaped handle 139 including a portion 141 adapted to be gripped by the operator. As thus far described, the power rake 111 is not materially different from the prior power rake 11.

In accordance with the invention, and in order to prevent recirculation of thatch in the housing and thereby to substantially reduce accumulation in the housing of thatch cut by the blades and discharged therefrom, the housing is provided with a baffle 151 (See FIG. 3) which extends downwardly and forwardly from behind the reel 125 to adjacent the periphery 153 of the path of blade rotation. While other constructions could be employed, in the illustrated construction, the baffle 151 preferably extends at an angle of approximately 45° to the horizontal top wall 115 and from adjacent to the top wall 115 to between about 1 o'clock and about 3 o'clock when seen from the side in relation to the reel axis 155.

Also in accordance with the invention, there is provided a guard which is pivotally mounted from the housing 115, which extends between the side walls 117 and 118, and which preferably is arranged to constitute a continuation of the baffle 151 and is adapted to travel adjacent to the ground 168. While other constructions could be employed, in the illustrated construction, the guard 161 includes a forward portion which is pivotally mounted from the housing 115 about an axis 165 and which is downwardly concave in fore and aft cross-section. In addition, the guard 161 includes a rearward portion 167 which preferably extends smoothly from the forward portion and is upwardly concave in fore and aft section and which is adapted to ride on, or adjacent, to the ground 168.

Preferably, the transition from the baffle 151 to the forward guard portion 163 is smooth, i.e., the baffle 151 extends approximately tangentially to the downwardly concave forward guard portion 163. The guard also includes spaced side walls 169 which extend downwardly from the forward guard portion 163.

The disclosed baffle 151 and guard 161 advantageously prevent recirculation of thatch within the housing 113 and serve to more or less uniformly deposit the thatch on the ground 168 rearwardly of the power rake 111, while at the same time, avoiding any possibility of discharge of unwanted solid objects toward the rear.

Also in accordance with the invention, power transmission control means are provided for interrupting power transmission from the power source 129 to the reel 125 when the operator does not take positive action to continue such power transmission. If desired, brake means can also be provided to stop rotation of the reel 125 in the absence of positive action by the operator to continue power transmission.

While various other arrangements can be employed, in the illustrated construction, the power transmission control means comprises a clutch member 181 movable relative to a position engaging the belt 131 so as to provide power transmission, together with means biasing the clutch member 181 away from the position providing power transmission. In addition, the control means includes a control or element 183 movable relative to a position adjacent to the handle portion 141 so as to afford retention by the operator of the control 183 adjacent to the handle 139 during use, together with linkage means for connecting the control 183 to the clutch member 181 for moving the clutch member 181 to the power transmitting position against the action of the biasing means in response to movement of the control 183 to the position adjacent to the handle portion 141 and for displacing the control 183 from the position adjacent to the handle portion 141 in response to movement of the clutch member 181 away from the power transmitting position under the action of the biasing means when the control 183 is not retained by the operator adjacent to the handle portion 141.

While various other arrangements could be employed, in the illustrated construction, the clutch member 181 comprises an idler which is rotatably mounted on a lever 185 pivotally mounted at 187 on the housing 113 so as to engage the idler 181 with the outside surface of the endless belt 131.

While other arrangements could be employed, in the illustrated construction, the biasing means comprises a helical spring 189 arranged to urge the lever 185 in the counterclockwise direction as seen in FIG. 3.

While other arrangements could be employed, in the illustrated construction, the control 183 comprises a bail 190 which is pivotally mounted at 192 to the spaced upright members of the handle 139 and which includes a cross portion 191 movable to a position adjacent to the handle portion 141. Fixed to the bail 190 is a lever 193 including an ear or tab 195 which engages the handle 139 to limit pivotal movement of the bail 190 in the counterclockwise direction, as seen in FIG. 3.

While other arrangements could be employed, in the illustrated construction, the linkage comprises a flexible member 197 which can be guided by suitable means 198 fixed to the handle or otherwise and which is connected to the outer end of the bail lever 193 and to an arm 199 extending from the lever 195 which supports the idler 181. Desirably, a spring 201 is incorporated or connected to the flexible member 197 between the lever 193 and the arm 199, which spring 201 extends in response to movement of the bail 190 to the position adjacent to the handle portion 141 so as thereby to provide lost motion and to overcome the biasing action of the spring 189.

In order to afford up-milling, i.e., operation of the power rake 111 in the direction opposite from the normal direction, the handle 139 is mounted to the housing 113 so as to permit movement between a rearwardly extending position shown in FIG. 3 and a forwardly extending position used during upmilling and shown in FIG. 8. In this regard, the side walls 117 and 118 include respective portions 211 extending upwardly from the top wall 115 and respective studs 213 to which the handle 139 is removably pivotally mounted. In addition, the upwardly extending portions 211 of the side walls 117 and 118 respectively include integrally formed spaced ears or tabs 215 and 217 respectively limiting pivotal movement of the handle 139 to the rearwardly extending position and to the forwardly extending position. A pulley or bearing 221 (See FIG. 8) is mounted from the side wall 217 and, during up-milling, the flexible member 197 is trained thereabout and then forwardly for connection to an extension link 223, which in turn, is connected to the bail lever 193. Thus, when the handle 139 is located in the forwardly extending position for up-milling, the bail or control 183 is operably connected to the clutch member 181 for controlling power transmission.

Also in accordance with the invention, the pivotally mounted lever 185 also fixedly supports a brake element 231 which, when the clutch member 181 is in the power transmitting position, is positioned clear of the belt 131 and which is engageable with the inside of the belt 131 in response to movement of the clutch member 181 from the power transmitting position.

The disclosed clutch and brake arrangement advantageously serves to prevent reel rotation in the absence of continued operator maintenance of the bail 183 in adjacent relation to the handle portion 141.

In further accordance with the invention, there is provided a pair of laterally spaced front wheels 235, and means mounting the wheels 235 to afford selective vertical location of the wheels 235 relative to the housing 113 and to selectively afford rocking of the wheels 223 about a fore and aft axis located in spaced relation to the fore and aft center of the power rake 111.

While other arrangements could be employed, in the illustrated construction, the housing 113 is provided, in off-set relation to the fore and aft center line of the power rake 111, and in the direction toward the side wall 117 adjacent to the power source 129, with a bracket 236 including a threaded, generally vertically extending aperture 237 receiving a threaded stud or shaft 239. The upper end of the stud 239 is provided with a manually grippable head or handle 241 to facilitate rotation of the stud 239 so as to cause vertical stud displacement relative to the housing 113. A wing nut 242 is provided to releasably hold the stud 239 in vertically adjusted position. At its lower end, the stud 239 is connected to the horizontal leg of a U or L shaped hanger 243 so as to afford common vertical movement of the hanger 243 with the stud 239 while simultaneously permitting relative rotation between the hanger 243 and the stud 239 about the axis of the stud 239.

The hanger 243 includes a vertical leg 245 which is pivotally connected about a fore and aft axis to an axle means which, in the disclosed construction, is in the form of a transverse structure or beam 247 which, adjacent to its ends, rotatably supports the pair of laterally spaced front wheels 235. Thus, the front wheels 235 can be vertically displaced by manual manipulation of the head 241 and, in addition, the wheels 235 are mounted so as to enable conformance to ground contour.

In further accordance with the invention, means are provided on the housing 113 and on the axle means or beam 247 for guiding vertical movement of the axle means and for selectively limiting or restricting the permissible range of vertical movement of the ends of the axle means. While other arrangements are possible, in the disclosed construction, such means comprises formation in the side walls 117 and 118 of respective vertically extending slots receiving the axle means or beam 247, together with respective clamping blocks 251 which respectively project into the slots 249 and which can be adjustably positioned in the slots 249 to limit the vertical length thereof. Thus when located in abutting relation to the axle means or beam 247, the clamping blocks 251 serve to rigidify the axle means 247 against movement relative to the housing 113.

More specifically, in the disclosed construction, the clamping blocks 251 are identically constructed and each includes a portion 253 which is received in the associated slot 249 together with a pair of wings 255 which extend from the portion 253 and which, when the clamping block 251 is locked, bear against the margins of the associated slot 249. Extending fixedly from the clamp portion 253 is a threaded stud 257 which projects through the associated slot 249 and outwardly therefrom. Threaded on the extending stud is a nut 259 having an integrally extending lever 261. The pitch of the thread is arranged so that approximately one quarter turn of the lever 261 will serve to lock and unlock the clamping block 251. More specifically, when the lever 261 extends forwardly, the engagement of the nut 259 on the threaded stud 257 tightly frictionally engages the wings 255 against the associated side wall, thereby locking the clamping block 251 in the slot 249. However, rotation of the lever 261 upwardly about one-quarter turn sufficiently increases the distance between the nut 259 and the clamping block 251 so as to unclamp the block from the associated side wall and to permit vertical adjustment of the clamping block 251 in the associated slot 249. Thereafter, return of the lever 261 to the forwardly extending position locks the clamping block 251 in adjusted position.

Thus, the front wheel mounting arrangement can be employed to provide infinite adjustability within limits in the height of the transverse beam 247 above the ground 163 and to selectively permit rocking of the transverse beam 247 about a fore and aft off-set axis, so as thereby to enable the front wheels 235 to follow ground contour or to rigidify the transverse beam 247 relative to the housing 113 in adjusted vertical condition.

In further accordance with the invention, there is shown in FIG. 7 a power rake 311 which includes means for catching thatch leaving the cutting blades. In this regard, the power rake 311 is generally constructed in the same manner as the power rake shown in FIGS. 3, 5 and 6 except as mentioned hereinafter. Thus, in the power rake 311 shown in FIG. 7, there is provided a catcher 313 which includes a rigid bottom or base 315 supporting one or more ground engaging means, such as, for instance, one or more caster wheels 317, and which also supports a wire frame 319, which in turn, supports a cloth or plastic bag 321 including a mouth which receives the thatch discharge from the housing.

In the power rake 311 shown in FIG. 7, the side walls are extended rearwardly at 323 as compared to the side walls of the power rake 111 and there is provided a member 325 which is pivotally mounted on the housing, which extends between the side walls and from adjacent the upper end of the baffle, and which constitutes a guard when the catcher 313 is disconnected from the rake 311 and which constitutes an upper transition wall when the catcher 313 is mounted on the power rake 311.

More specifically, in order to facilitate mounting of the catcher 313 on the power rake 311, the base or bottom 315 includes two laterally spaced, horizontally outwardly extending pins 327 which are adapted to enter into laterally spaced slots 329 located in the side walls and respectively including rearwardly open, horizontal portions 331. At their forward ends, the slot portions 331 communicate with respective downwardly extending vertical portions 333. Thus, during assembly of the catcher 313 to the power rake 311, the pins 327 extending from the base 315 are fully inserted into the lower ends of the vertical portions 333 of the slots 329. When thus asembled, the catcher 313 will follow the power rake 311 during movement along the ground.

When the catcher 313 is assembled to the power rake 311, the catcher side walls extend rearwardly from a position approximately adjacent to the inside surface of the side housing walls.

The combination guard and transition wall member 325 supports an arm 341 including a portion 343 extending rearwardly in spaced relation to the member 325 so as to define an opening into which the top of the front part of the catcher 313 is received, thus locating the member 325 to provide a top transition wall between the rake 311 and the catcher 313 when the catcher 313 is assembled to the rake 311. When the catcher 313 is disassembled from the rake 311, the member 325 pivots downwardly to engage the lower end thereof against the ground to prevent discharge of thatch upwardly toward the operator and to prevent discharge of solid articles toward the operator.

Still further in accordance with the invention, the catcher 313 is provided, along the lower part of the mouth thereof, with a guide plate 351 which extends rearwardly and upwardly and which, when the catcher 313 is assembled to the rake 311, extends from adjacent the periphery of the path of the cutting reel and from adjacent to the ground in spaced relation to the baffle 151 and member 325 to provide therebetween a thatch discharge passageway.

In still further accordance with the invention, the prior power rake 11 can be modified as shown in FIG. 4 by removing the previous baffle 41 shown in FIG. 1 and by including a baffle 451 and a guard 461 which substantially prevents thatch circulation in the housing and, therefore, reduces power consumption. The baffle 451 can be bolted or otherwise connected to the housing and includes an arcuate portion 453 extendind downwardly and rearwardly in adjacent relation to the periphery of the path of the rotating reel and a rearward portion 455 extending upwardly and rearwardly from the lower end of the arcuate portion 453 in the area within from about 1 o'clock to 3 o'clock when viewed from the side in regard to the axis of reel rotation. Other arrangements can, of course, be employed to provide a baffle which, in accordance with the invention, extends upwardly and rearwardly from the periphery of the path of reel rotation in the area between about 1 o'clock and 3 o'clock as seen from the side with respect to the reel axis.

Various of the features of the invention are set forth in the following claims.

What is claimed is:

1. A power rake comprising a housing including a top wall, spaced side walls, and means supporting said housing for travel over the ground, a thatching reel including a plurality of thatching blades, means supporting said thatching reel in said housing for rotation of said blades in respective vertical paths, means for rotating said reel so that, adjacent to the ground, said blades travel in the direction opposite to the intended direction of travel, and baffle means extending downwardly and forwardly between said side walls from behind said reel and terminating adjacent to the periphery of the path of said blades for substantially reducing accumulation within said housing of thatch cut by said blades and discharged therefrom.

2. A power rake in accordance with claim 1 wherein said baffle terminates in the area between about 1 o'clock and 3 o'clock relative to the axis of reel rotation when seen from the side.

3. A power rake in accordance with claim 1 and further including a guard having a width substantially equal to the distance between said side walls and having a forward portion and a rearward portion, and means pivotally mounting said forward guard portion to said housing with said forward guard portion extending to adjacent said baffle and with said rearward guard portion extending to adjacent the ground.

4. A power rake in accordance with claim 3 wherein said forward guard portion in fore and aft section, is downwardly concave and said rearward guard portion, in fore and aft section, is upwardly concave.

5. A power rake in accordance with claim 3 wherein said forward guard portion extends approximately tangentially to said baffle.

6. A power rake in accordance with claim 1 and further including a thatch catcher detachably connected to said housing and extending rearwardly therefrom, and a member mounted on said housing and extending between said side walls and rearwardly from said baffle for pivotal movement between a first position located in adjacent relation to the ground when said catcher is detached from said housing and a second position located, when said catcher is connected to said housing, in bridging relation between said housing and said catcher.

7. A power rake in accordance with claim 6 wherein said catcher includes, adjacent to the bottom of the part adjacent to said housing, a deflector extending upwardly and rearwardly and in downwardly spaced, generally parallel relation to said baffle.

8. A power rake in accordance with claim 7 wherein said side walls extend rearwardly beyond said top wall and said catcher is releasably connected to said side walls and includes a bottom wall having a forwardly extending portion located between said side walls.

9. A power rake in accordance with claim 8 wherein said deflector is located between said side walls and wherein said side walls, said deflector, said baffle, and said member define a thatch discharge passageway between said housing and said catcher.

10. A power rake in accordance with claim 6 and further including means on said member supporting the top of the adjacent part of said catcher.

* * * * *